(12) United States Patent
Stöhrer et al.

(10) Patent No.: US 12,473,525 B2
(45) Date of Patent: Nov. 18, 2025

(54) LABORATORY TEMPERING DEVICE AND METHOD

(71) Applicant: Eppendorf SE, Hamburg (DE)

(72) Inventors: Frederic Stöhrer, Hamburg (DE);
Patrick Schuenemann, Hamburg (DE);
Lutz Timmann, Hamburg (DE); Hauke Maltzen, Hamburg (DE)

(73) Assignee: Eppendorf SE, Hamburg (DE)

( * ) Notice: Subject to any disclaimer, the term of this patent is extended or adjusted under 35 U.S.C. 154(b) by 857 days.

(21) Appl. No.: 16/981,263

(22) PCT Filed: Mar. 18, 2019

(86) PCT No.: PCT/EP2019/056697
§ 371 (c)(1),
(2) Date: Sep. 15, 2020

(87) PCT Pub. No.: WO2019/175432
PCT Pub. Date: Sep. 19, 2019

(65) Prior Publication Data
US 2021/0024871 A1    Jan. 28, 2021

(30) Foreign Application Priority Data

Mar. 16, 2018  (EP) .................................... 18162369

(51) Int. Cl.
*C12M 1/00*  (2006.01)
*B01L 1/02*  (2006.01)
*B01L 99/00*  (2010.01)
*C12M 3/06*  (2006.01)

(52) U.S. Cl.
CPC ............. *C12M 41/14* (2013.01); *B01L 1/025* (2013.01); *C12M 27/16* (2013.01); *B01L 2200/147* (2013.01)

(58) Field of Classification Search
CPC ...... B01L 1/025; B01L 2200/147; B01L 7/00; C12M 27/16; C12M 41/14
See application file for complete search history.

(56) References Cited

U.S. PATENT DOCUMENTS

| | | | |
|---|---|---|---|
| 6,063,619 A | 5/2000 | Tachi et al. | |
| 6,177,271 B1 | 1/2001 | Butts et al. | |
| 6,518,059 B1 | 2/2003 | Butts | |
| 9,206,384 B2 | 12/2015 | Lee et al. | |
| 2008/0063573 A1* | 3/2008 | Ammann | B01L 7/52 422/105 |
| 2009/0098642 A1 | 4/2009 | Kiyota et al. | |

(Continued)

FOREIGN PATENT DOCUMENTS

| | | |
|---|---|---|
| CN | 203112845 U | 8/2013 |
| CN | 204342796 U | 5/2015 |
| DE | 19952330 A1 | 5/2001 |

(Continued)

*Primary Examiner* — Lydia Edwards
(74) *Attorney, Agent, or Firm* — Todd Lorenz

(57) ABSTRACT

The invention relates to a laboratory tempering device for storing laboratory samples at a target temperature. It relates in particular to an incubator (1) for growing cell cultures. The invention moreover relates to a method for setting a target temperature in a laboratory tempering device that is based in particular on estimating the temperature inside the chamber.

14 Claims, 6 Drawing Sheets

(56) References Cited

U.S. PATENT DOCUMENTS

2011/0124093 A1    5/2011  Yamashita
2015/0050725 A1    2/2015  Pieczarek et al.

FOREIGN PATENT DOCUMENTS

| GB | 2438683 A | 12/2007 |
|---|---|---|
| JP | H01222769 A | 9/1989 |
| JP | 2001321681 A | 11/2001 |
| JP | 2006-122019 A | 5/2006 |
| JP | 2013-027384 A | 2/2013 |

* cited by examiner

LABORATORY TEMPERING DEVICE AND METHOD

The invention relates to a laboratory tempering device for tempering laboratory samples at a target temperature. It relates in particular to an incubator for growing cell cultures. The invention moreover relates to a method for setting a target temperature in a laboratory tempering device. The invention also relates to a method for estimating the temperature inside the chamber of said laboratory tempering device.

Laboratory tempering devices are necessary to maintain, in particular keep, laboratory samples in a protected environment at a specific target temperature. Incubators are used in biological and medical laboratories to keep cells in cell cultures under controlled ambient conditions to thus facilitate the growth of live cells in vitro. To this end, the temperature and gas composition or, respectively, humidity inside an incubator chamber that is isolated from the environment is kept at the desired values by the components of the incubator. Eukaryotic cells must be cultured in $CO_2$ incubators. The atmosphere is formed by air with a specific $CO_2$ and $O_2$ content and a specific humidity; often, a suitable temperature will be 37° C. Such laboratory tempering devices have a housing surrounding the incubator chamber, for example an outer housing having a housing opening through which the user can place the samples inside, and remove them from, the housing, in particular the incubator chamber.

One key requirement for laboratory tempering devices is the precise maintenance or setting of the user-desired target temperature inside the chamber of the laboratory tempering device. Incubators typically have a control circuit to which a temperature sensor inside the chamber or in connection with the inside of the chamber is assigned as a measuring element and to which the incubator's temperature control units are assigned as a control element. The accuracy and reliability of the temperature control decisively affects how accurate and reliable the temperature sensor is. Temperature sensors located inside an incubator are exposed to various adverse effects over their lifetime caused by laboratory samples, cleaning agents in combination with a wide range of different temperatures of up to 180° C. as required for sterilization purposes. There is also interference by users, such as laboratory staff and maintenance personnel, who regularly manipulate the inside of the chamber. The temperature sensor's reliability may suffer as a result of said effects. To ensure its reliability, the temperature sensor may be calibrated at regular intervals which is associated with some effort, however. Hence, there is a need for measures that will benefit a reliable and efficient operation of a laboratory tempering device.

U.S. Pat. No. 6,518,059 B1 discloses a laboratory microplate incubator including a housing having an enclosed incubation chamber therein and a temperature control assembly that uniformly maintains the temperature within the incubator in a desired range. The temperature control assembly includes a heater positioned within the housing for heating the chamber, a temperature sensor and a controller.

U.S. Pat. No. 6,063,619 discloses an incubator providing for an anaerobic and constant-temperature environment within an incubation jar and comprising an incubator body, an open-top incubation jar disposed in said incubator body and an outer cylindrical casing made of aluminum and an inner cylindrical casing made of stainless steel. A planar heater is disposed in intimate contact with the exterior surface of said outer cylindrical casing, and a temperature sensor is mounted in the wall of said outer cylindrical casing. The heating of the incubation jar by the heater is controlled with a switch provided on the front of the incubator body.

The object of the present invention is thus to provide an enhanced laboratory tempering device that can be operated in a reliable and efficient manner and a method pursuant to which a laboratory tempering device can be operated in a reliable and efficient manner.

The invention solves this problem by providing the laboratory tempering device according to claim 1 and the method according to claims 7 and 10. Preferred embodiments are, in particular, the subject of the sub-claims.

The laboratory tempering device according to the invention serves to temper laboratory samples at a target temperature $T_{target}$ and comprises: —a chamber for receiving laboratory samples inside the chamber the outer sides of which are formed by at least one chamber wall and a chamber door that closes a chamber opening through which users can access the inside of the chamber; —a temperature control unit for tempering the chamber that is mounted in thermal contact with an outer side of the chamber; —a temperature sensor mounted in thermal contact with an outer side of the chamber to record a temperature $T_{ak}$; —an insulation element thermally insulating the temperature control unit, temperature sensor, and chamber from the environment; and—an electric controller provided to control the temperature $T_{ak}$ by means of the temperature sensor and temperature control unit to a set-point temperature with value $T_{x0}$ which is predetermined such that the temperature setting $T_{ak}=T_{x0}$ will result in the temperature $T_K$ inside the chamber being set to $T_K=T_{target}$.

With the laboratory tempering device according to the invention, the temperature inside the chamber is set by controlling the temperature control unit(s) by means of the measuring by a temperature sensor positioned outside the chamber. With this arrangement, the temperature sensor is located in an area that is protected from the environment and from the interior of the chamber. Thanks to the insulation element, in particular the outer housing, the temperature sensor that is important for setting the temperature in the inside is fully protected. This will prolong the reliable service life of the temperature sensor and the laboratory tempering device can be operated more efficiently. The term "tempering" generally describes setting a temperature which can be accomplished through heating and/or cooling and which may imply a control unit or other temperature-setting control. The temperature $T_{target}$ can be in particular user-selectable.

This concept according to the invention is based on prototype measurements which surprisingly showed that in order to be able to reliably set the temperature inside a chamber that is insulated against the outside by means of an insulation device one does not need a temperature sensor inside the chamber. Instead, it became clear that it suffices to control the temperature by means of a temperature sensor positioned on the outside of the chamber and by the exterior temperature control units. With such laboratory tempering devices that are normally operated at an outside temperature between 18° C. and 28° C., the temperature inside the chamber follows the temperature controlled on the outer side of the chamber in accordance with immutable relationships that depend only on the respective laboratory tempering device used. In particular, said immutable relationships depend only on the individual configuration of the laboratory tempering device, which is referred to as "device-specific", and in case of an always identical configuration of laboratory tempering devices they depend only on the type of laboratory tempering device, which is referred to as "apparatus-specific".

In case of apparatus-specific immutable relationships or properties, identical laboratory tempering devices do not differ individually in terms of said immutable relationships or properties and the immutable relationships can be applied to all identical laboratory tempering devices, i.e. to a type of laboratory tempering device. In the present case, the immutable relationships relate to a constant, device-specific or apparatus-specific value $T_{x0}$: temperature $T_K$ inside the chamber correlates to temperature $T_{ak}$ measured outside, temperature $T_{ak}$ measured outside follows temperature $T_K$ inside the chamber and in stationary equilibrium of thermal flows of the laboratory tempering device the same value $T_{ak}=T_{x0}$ is always achieved. So in order to be able to reliably and exactly set temperature $T_K$ inside the chamber one must only set the exterior temperature sensor to $T_{ak}=T_{x0}$. Value $T_{x0}$ differs for each desired target temperature $T_K=T_{target}$ inside the chamber. Value pair ($T_{target}$; $T_{x0}$) or, respectively, several of these values are determined in advance with a laboratory tempering device as will be explained below, and can then be used in the individual laboratory tempering device in case of device-specific immutable relationships, or in all identical laboratory tempering devices in case of apparatus-specific immutable relationships.

A device-specific specification of $T_{x0}$ or of another property is advantageous because not all devices of a production series must be configured identically which allows for greater flexibility in selecting components.

Preferably, the laboratory tempering device does not include a temperature sensor that measures the temperature inside the chamber. One can thus do without a temperature sensor and save on the cost of servicing it. This will improve the cost efficiency of the laboratory tempering device.

Preferably, the laboratory tempering device does not include a control unit that controls temperature $T_K$ inside the chamber. Preferably, the laboratory tempering device does not include a control unit comprising a temperature sensor that measures temperature $T_K$ inside the chamber and functions in particular as a measuring element of said control unit. In particular, temperature $T_K$ inside the chamber is set to the desired value only as a result of the temperature setting $T_{ak}=T_{x0}$, as an inevitable result of the inherent properties or above-mentioned immutable relationships for the laboratory tempering device. In other words, according to the invention, temperature $T_{ak}$ of the measuring sensor on the outer side of the chamber is set to set-point temperature $T_{x0}$ by operating the at least one temperature control unit and temperature $T_K$ inside the chamber follows this setting via the predetermined device-specific or apparatus-specific correlation ($T_{target}$; $T_{x0}$) of $T_{x0}$ to the desired target temperature $T_K=T_{target}$ inside the chamber. Accordingly, this type of temperature control inside the chamber can be also referred to as an "indirect setting" of temperature $T_K$ inside the chamber even though it is not a temperature setting of $T_K$ in the traditional sense.

The electric controller preferably comprises a data storage unit. Preferably, the at least one predetermined value $T_{x0}$ is stored in said data storage unit which value is taken from the data storage unit for the purpose of setting temperature $T_{ak}=T_{x0}$. However, value $T_{x0}$ can be provided not only digitally but also analogically.

Preferably, the electronic controller is configured to operate the temperature control unit with electric power $P_{temp}(t)$ during temperature setting $T_{ak}=T_{x0}$ as a function of time t. In particular, the laboratory tempering device may be configured to operate the temperature control unit by means of a pulse width modulation (PWM) of the current. Power is then determined especially through the PWM duty cycle as the amplitude of current is preferably non-varying.

Preferably, the electronic controller is configured for the electric controller to be able to determine said power $P_{temp}(t)$ and the time-dependent value $T_{ak}(t)$. The electronic controller preferably comprises a data processing unit, in particular a computer processor. Preferably, the data processing unit is configured to determine or calculate a value $T_{Kb}$ as the temperature which describes or estimates the temperature $T_K$ inside the chamber. This is done in particular such that the data processing unit determines the value $T_{Kb}$ as a value that depends on at least one other parameter, in particular by means of a calculation rule or at least one equation. The data processing unit is preferably configured to calculate the temperature $T_{Kb}$ as a function of the power $P_{temp}(t)$ and the measured temperature $T_{ak}(t)$. The data processing unit is preferably programmed accordingly to determine $T_{Kb}$. In particular, the electronic controller or data processing unit comprises a computer program that calculates $T_{Kb}$ when executed by the controller or data processing unit. The computer program may be stored in a data storage unit of the laboratory tempering device. In particular, the controller or data processing unit is configured to perform one of the methods according to the invention and/or at least one, several, or all of the method steps of one of the methods according to the invention.

The laboratory tempering device preferably comprises a chamber door sensor that records the opening and closing of the chamber door. In case of a laboratory tempering device having an outer housing and a housing door, as is most often the case with incubators, there is preferably a housing door sensor which records the opening and closing of the housing door. The laboratory tempering device preferably comprises an outer housing having a housing door which, when open, allows the user to access the inside of the chamber through the opened chamber door, and in particular a housing door sensor that records the opening and closing of the housing door. The electric controller is preferably configured to record the opening and closing of the chamber door or housing door as a function of time and to calculate temperature $T_{Kb}$ as the temperature inside the chamber also as a function of the points in time when the chamber door or housing door is opened and closed. This solves the problem that the temperature inside the chamber is to be known although it is not necessarily measured in the invention.

The electric controller is preferably configured to calculate a temperature $T_{Kb}(t)$ after opening and closing the chamber door or housing door of the laboratory tempering device as a function of time t as the temperature inside the chamber pursuant to the preferred equation $$T_{Kb}(t)=T_{ak}(t)+T_{offset}-(P_{temp}(t)-P_{basis}(t))*F \quad \text{(equation 1)},$$

with $T_{offset}$ being defined by $T_{offset}=T_{x0}-T_{target}$, $P_{basis}(t)$ being the power applied by the temperature control unit, or by several temperature control units, prior to opening the chamber door or housing door at steady state at a given ambient temperature and F being a scaling factor. Its determination will be described below. Preferably, value F is apparatus-specific and is preferably stored digitally in a data storage unit of the electric controller or provided analogically. However, value F may also be device-specific.

$P_{basis}(t)$ is in particular a moving average of values $P_{basis}(t)$ that may possibly vary over time. Such averaging leads to greater precision. The electric controller is preferably configured to store a plurality of values $P_{basis}(t)$ as a function of time. In particular, the electric controller is preferably configured to record and store the opening and closing of the chamber door or housing door, abbreviated as ZT(t) ("state of the door"), as a function of time. The electric controller is preferably configured to determine the mean value of the power prior to the opening of the door in stationary equilibrium by combining information $P_{basis}(t)$ and ZT(t), in particular as a moving average of data $P_{basis}(t)$, in particular as a moving average of duty cycle values, referred to in short as PWM. In stationary equilibrium of thermal flows of the laboratory tempering device, $P_{basis}(t)$ depends on the outside temperature which is normally between 18° C. and 28° C.

For a certain type of laboratory tempering device, $T_{x0}$ is preferably specified by the manufacturer. In a calibration procedure performed in thermal equilibrium of the chamber, $T_{x0}$ is preferably measured by means of the outer temperature sensor $T_{ak}$ at the predetermined temperature inside the chamber $T_K=T_{target}$ at the laboratory tempering device or at an identical laboratory tempering device. In this calibration procedure, $T_K=T_{target}$ is preferably set in a verified manner, i.e. with a calibrated sensor, in particular controlled by connecting a mobile—calibrated—temperature sensor, which has been placed inside the chamber for calibration purposes, to the electric controller of the laboratory tempering device to establish a control circuit in which the mobile temperature sensor $T_{inside}$ inside the chamber operates as a measuring element of the control circuit and the temperature control unit(s) as a control element of the control circuit.

For a certain type of laboratory tempering device, scaling factor F is preferably specified by the manufacturer. To this end, the laboratory tempering device is placed in an environment having a known outside temperature $T_{environment}$, which $T_{environment}$ is for example =18° C. The temperature inside the chamber $T_K$ is set to a value $T_K=T_{target\_0}$, e.g. $T_{target\_0}=50°$ C. In particular, $T_{environment}$ does not equal $T_{target\_0}(T_{environment}<>T_{target\_0})$. To this end, a mobile temperature sensor $T_{inside}$ that has been placed inside the chamber is connected to the electric controller of the laboratory tempering device to establish a control circuit in which the mobile temperature sensor $T_{inside}$ inside the chamber operates as a measuring element of the control circuit and the temperature control unit(s) as a control element of the control circuit. The control is performed with the chamber door and/or housing door (if an incubator, then housing door sensor) being closed. The chamber door is opened at a certain point in time t0 and closed at a later point in time t1 which may be e.g. between 1 and 10 minutes later than t0. The temperature inside the chamber $T_{inside}(t)$ is measured and stored as a function of time prior to and during opening and closing and thereafter. Preferably, the above-mentioned "equation 1" or another equation is then used as a fit curve to determine factor F by means of error compensation between the fit curve and the values $T_{inside}(t)$, whereby such error compensation should consider in particular, preferably only, the period between opening and closing of the chamber door or housing door. Preferably, factor F as thus determined is stored in all other laboratory tempering devices of the same type and used to estimate or calculate the temperature inside the chamber. It is preferably stored in a data storage unit of the electric controller of the laboratory tempering device.

Preferably, the laboratory tempering device comprises a user interface unit having a display unit that is configured to show a visual display on the display unit. A user interface unit may be an integral part of a laboratory tempering device, in particular of an incubator, or it may be a module that can be used with several laboratory tempering devices of the same type. The electric controller of the laboratory tempering device or a user interface unit preferably comprises: a controller for the user interface unit; a communications unit for establishing a data connection with a laboratory device, in particular with an incubator, via an interface unit of such laboratory device or incubator; an input unit for recording user inputs of a user; an output unit, in particular a display unit or display, for outputting information to the user, in particular a touch-screen display. The controller of the user interface unit is preferably configured to exchange data with the controller of the laboratory tempering device or incubator via the data connection. The laboratory tempering device and/or its controller and the user interface unit may be configured, in particular, such that the user can select or enter the desired target temperature $T_{target}$ via the user interface unit and, in particular, that the thus entered target temperature $T_{target}$ is stored in a data storage unit of the laboratory tempering device.

Preferably, the electric controller is configured to output the calculated value $T_{Kb}(t)$ on the display unit and update it at specified intervals, in particular when the continuous recalculation shows a change in value $T_{Kb}(t)$.

The invention also relates to a method for setting a target temperature $T_{target}$ in the chamber of a laboratory tempering device according to the invention, comprising the steps of:

Determining the apparatus-specific value $T_{x0}$ in particular pursuant to the above method, with $T_{x0}$ being predetermined such that the setting of temperature $T_K$ inside the chamber to $T_K=T_{target}$ results from the temperature setting $T_{ak}=T_{x0}$.

Setting the outside temperature $T_{ak}$ to $T_{ak}=T_{x0}$ which results in the temperature $T_K$ inside the chamber being set to $T_K=T_{target}$.

Preferably, the laboratory tempering device according to the invention, in particular its controller, is configured to perform the above method for setting a target temperature $T_{target}$ in the chamber of the laboratory tempering device, in particular by means of a data processing unit of the controller programmed for this purpose, which is configured in particular to execute a computer program that implements the above method.

The invention also relates to a method for estimating the temperature $T_K$ inside the chamber of a laboratory tempering device according to the invention, comprising the steps of:

Determining the apparatus-specific value $T_{x0}$ in particular pursuant to the above method, with $T_{x0}$ being predetermined such that the setting of temperature $T_K$ inside the chamber to $T_K=T_{target}$ results from the temperature setting $T_{ak}=T_{x0}$;

Determining the apparatus-specific value F, in particular pursuant to the above method;

in particular: Setting the temperature $T_K$ inside the chamber to $T_K=T_{target}$ through temperature setting $T_{ak}=T_{x0}$;

in particular: Opening and closing the chamber door and/or housing door of the laboratory tempering device;

Estimating the value $T_K$ inside the chamber through calculation such that $$T_K=T_{Kb}=T_{Kb}(t)=T_{ak}(t)+T_{offset}-(P_{temp}(t)-P_{basis}(t))*F$$

with $T_{offset}$ being defined by $T_{offset}=T_{x0}-T_{target}$, $P_{basis}(t)$ being the power applied by the temperature control unit prior to opening the chamber door or housing door at steady state at a given ambient temperature, $P_{temp}(t)$ being the electric power that is continuously retrieved by the temperature control unit and required for temperature control with temperature sensor $T_{ak}$. Factor F has the unit "kelvin" if the parameters $P_{temp}(t)$, $P_{basis}(t)$ are indicated as the duty cycle of a PWM when the amplitude is known.

Preferably, the laboratory tempering device according to the invention, in particular its controller, is configured to perform the above method for estimating temperature $T_K$ inside the chamber of the laboratory tempering device, in particular by means of a data processing unit of the controller programmed for this purpose, which is configured in particular to execute a computer program that implements the above method.

The laboratory tempering device for tempering laboratory samples is in particular a temperature-controlled cabinet for storing laboratory samples. Such devices are electrically operated and comprise a voltage terminal. However, the laboratory tempering device according to the invention may be also configured to not only temper laboratory samples but to also perform a different treatment on at least one laboratory sample. The laboratory tempering device may be configured to treat at least one laboratory sample. The laboratory tempering device may be in particular a laboratory machine configured to automatically handle at least one liquid laboratory sample. Such laboratory machines are also known as liquid handling robots. The chamber of a laboratory machine may be the work space that is separated from the environment and where the at least one laboratory sample may be transported and/or dosed by an automated treatment unit, in particular an automated pipetting robot.

The temperature-controlled cabinet tempers the laboratory samples, i.e. keeps the inside of the housing and hence the laboratory samples stored therein at a set-point temperature settable in particular by the user within certain tolerances using a temperature control. Said temperature may be higher than the room temperature (ambient temperature), e.g. in case of a heating cabinet or incubator, or it may be lower than the room temperature, e.g. in case of a refrigerator or freezer. Preferably, in a laboratory cabinet designed as a conditioning cabinet a climate parameter existing inside the housing is also controlled within certain tolerances. Said climate parameter may be the humidity and/or a gas concentration, e.g. a CO2, O2, and/or N2 concentration. Such conditioning cabinet is for example an incubator for laboratory samples consisting of live cell cultures.

Preferably, the laboratory tempering device comprises a housing. The housing is preferably an outer housing the walls of which are in contact with the environment. Accordingly, the housing door may be an outer housing door adjoining the environment when closed.

The housing door comprises in particular a hinge unit that pivotally connects the housing door with the housing. Such hinged door is moved by a rotation between an open and closed position. The hinge unit may be located in particular on the (if the laboratory cabinet is used as intended) vertically oriented outer edge of a cuboid housing that abuts the housing opening. If the laboratory cabinet is used as intended, the base plate of a cuboid housing is arranged horizontally, the side walls of the housing are arranged in particular vertically and the cover plate of the housing is arranged in particular horizontally opposite the base plate.

However, the chamber door or housing door may be also a sliding door moved by a translational motion between an open and closed position. A mixed pivoting/translational movement of the chamber door or housing door is also possible.

Preferably, the data processing unit is an integral part of the electric controller which controls the functions of the laboratory tempering device. The controller's functions are implemented in particular by electronic circuits. The controller may comprise a central processing unit (CPU) for processing data and/or a microprocessor that may comprise the data processing unit. The controller and/or the data processing unit is preferably configured to perform a control process referred to also as control software or control program. The functions of the incubator and/or controller may be described in method steps. They may be realized as parts of the control program, in particular as subprograms of the control program.

The laboratory tempering device is preferably an incubator. The incubator is a laboratory incubator and hence a device used to produce and achieve controlled climate conditions for various biological development and growth processes. It serves in particular to create and maintain a micro-climate with controlled gas and/or humidity and/or temperature conditions in the incubator chamber, whereby this treatment may be dependent on time. The laboratory incubator, in particular a treatment unit of the laboratory incubator, may comprise in particular a timer, in particular a timer clock, a temperature control unit designed as a heating and/or cooling unit and preferably a regulator for controlling a replacement gas fed to the incubator chamber, an adjustment device for composing the gas in the incubator's incubator chamber, in particular for adjusting the CO2 and/or O2 and/or N2 content of the gas and/or an adjustment device for adjusting the humidity in the incubator's incubator chamber.

The incubator comprises in particular the incubator chamber (=chamber) and also preferably a control unit having at least one control circuit to which the at least one temperature control unit is assigned as a control element and at least one temperature sensor as a measuring element. Depending on the embodiment, it may also be used to control the humidity. A water-filled pan in the incubator chamber may be heated or refrigerated to control humidity through evaporation. CO2 incubators serve in particular to culture animal or human cells. Incubators may comprise turning devices for turning the at least one cell culture container and/or a shaker for shaking or moving the at least one cell culture container.

The control device may be configured such that a program parameter or control parameter of the incubator is selected automatically as a function of other data, in particular ZT(t). In an incubator, a treatment of the at least one cell culture in at least one cell culture container that is controlled by a control parameter equals in particular a climate treatment performed on the at least one cell culture. Potential parameters, in particular program parameters, in particular user parameters, used to influence a climate treatment define in particular the temperature of the incubator space in which the at least one sample is incubated, the relative gas concentration of O2 and/or CO2 and/or N2 inside the incubation chamber, the humidity inside the incubation chamber and/or at least one flow parameter that influences or defines the course, in particular the order of an incubation treatment program comprising several steps.

One or more temperature sensors are provided which are arranged in particular in thermal contact with the outer side, in particular the chamber wall, in particular the upper chamber wall. To create a thermal contact, the temperature sensor may contact the outer side, in particular directly or through a thermal conduction medium such as a thermally conductive paste, a thermally conductive foil or a thermally conductive component. The temperature sensor may be mounted pressed against the outer side. Also, a plurality of >=10 temperature sensors may be provided. A temperature sensor may be for example a Pt 100 or Pt 1000 temperature probe.

The temperature control unit may be a combined heating/cooling unit. Preferably, it is only a heating unit. It may in particular produce heat via an electric resistance wire. The controller may comprise one or more control circuits each comprising at least one temperature control unit and in particular at least one temperature sensor which is in particular mounted in thermal contact with an outer side of the chamber to record a temperature Toutside $T_{ak}$. In case of several control circuits, the temperature control units serving as control elements and the temperature sensors serving as measuring elements are arranged in particular at different positions of the chamber's outer side, in particular at various outer sides of the chamber, e.g. on the ceiling wall, bottom wall, side wall, front wall and/or rear wall. In case of several control circuits, preferably the same number of device-specific values $T_{x0}$ are stored in a data storage unit of the laboratory tempering device with each control circuit being assigned its own value $T_{x0}$ to which the temperature of the respective temperature sensor is adjusted in order to set the target temperature $T_{target}$ inside the chamber. Preferably, a number N of control circuits is provided, the temperature control units and temperature sensors of which are arranged in particular at various positions of the chamber's exterior wall, whereas preferably 1<N <10 and preferably N is selected in particular from {1, 2, 3, 4, 5, 6}. N=4 is particularly preferred.

If the laboratory tempering device comprises several chambers that are thermally separated from one another by means of the insulation element or other insulation device, a separate target temperature $T_{target}$ may be provided for each chamber that is set by means of a corresponding setting $T_{ak}=T_{x0}$.

The laboratory tempering device or incubator may have precisely one chamber but may also comprise several chambers the atmosphere of which (temperature, relative gas concentration, humidity) may be adjustable in particular individually or collectively. A typical size of the inside chamber is between 50 and 400 liters.

Preferred embodiments of the laboratory tempering device according to the invention may be gathered in particular from the description of one of the methods according to the invention. Preferred embodiments of the methods according to the invention may be gathered in particular from the description of the laboratory tempering devices according to the invention.

Further preferred embodiments of the laboratory cabinet according to the invention may be gathered from the description of the exemplary embodiments pursuant to the figures.

FIGURES

FIG. 1b shows a perspective rear view of the incubator of FIG. 1a.

Figure 1A:
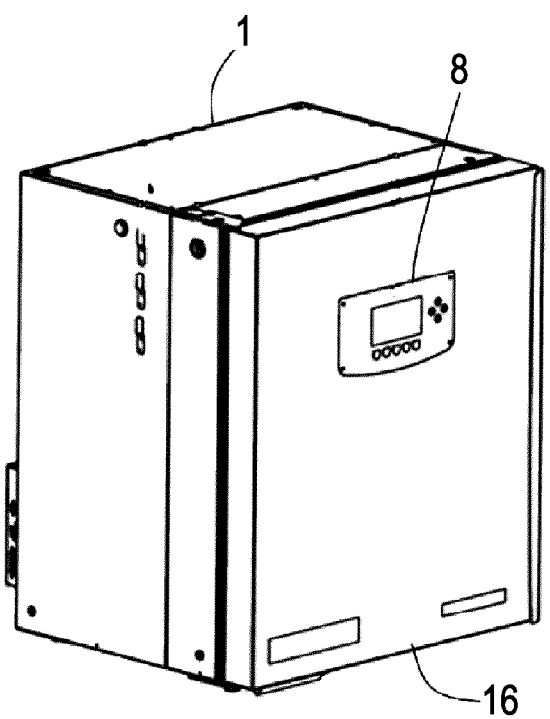
FIG. 1a shows a perspective front view of an incubator according to the invention pursuant to the exemplary embodiment.
Figure 1B:
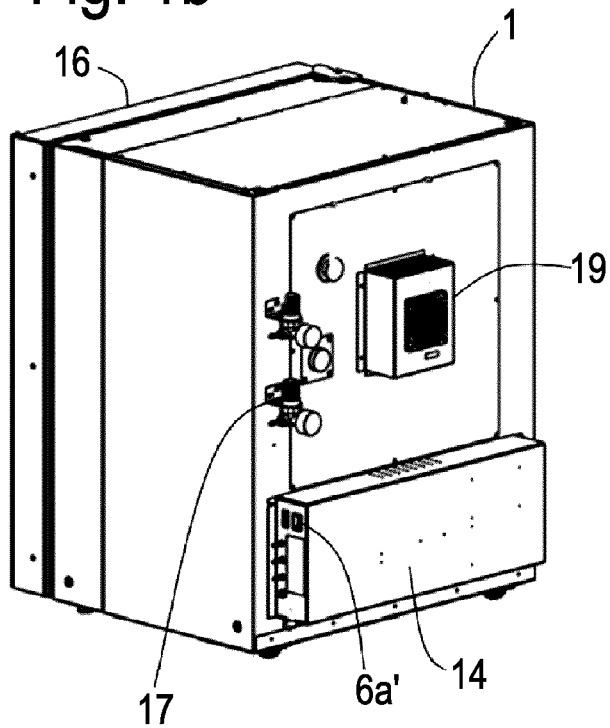
Figure 2:
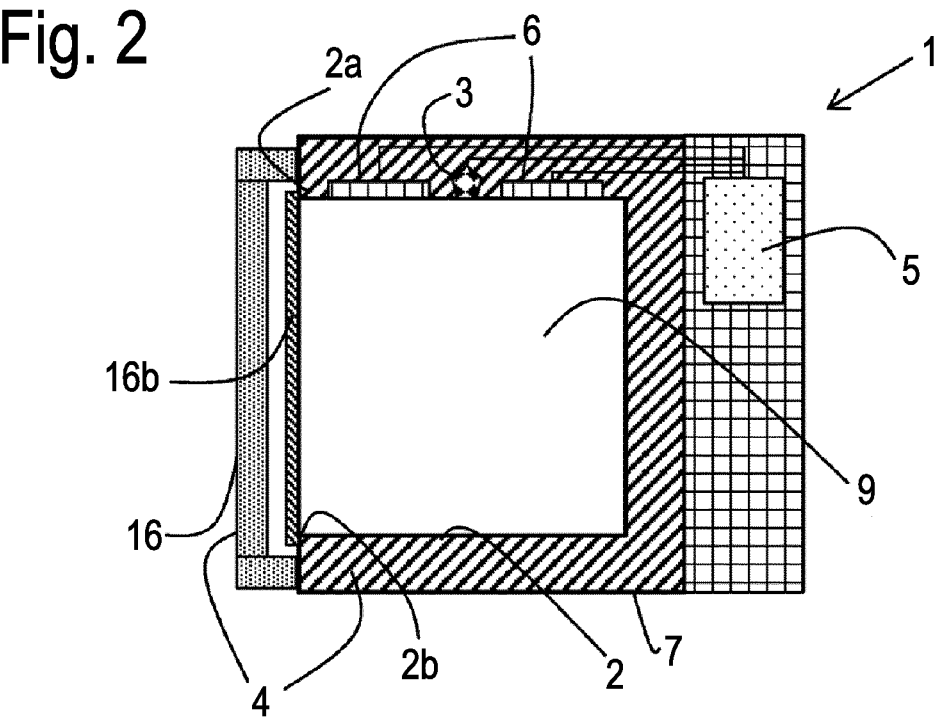
FIG. 2 shows a schematic lateral cross-sectional view of the incubator of FIGS. 1a, 1b.

FIG. 1a shows the laboratory tempering device configured as incubator 1 for growing cell cultures, in this case a CO2 incubator for growing eukaryotic cells. The incubator has an incubator chamber (see FIG. 2) for receiving at least one cell culture container comprising a cell culture that grows therein and a temperature sensor 3 attached in thermal contact to the outer side of the upper chamber wall 2a. The incubator comprises:

a chamber 2 for receiving laboratory samples inside chamber space 9 the outer sides of which are formed by at least one chamber wall 2a and one chamber door 16b that closes a chamber opening 2b through which the inside of the chamber can be accessed by the user, a temperature control unit 6 for tempering chamber 2 that is attached in thermal contact to an outer side 2a of the chamber formed by the upper chamber wall 2a, a temperature sensor 3 attached in thermal contact to the same outer side 2a of the chamber 2 for recording a temperature $T_{ak}$, an insulation element (4, 16) comprising an insulation layer 4 and the housing door 16 that thermally insulate the temperature control unit, the temperature sensor and the chamber from the environment, and an electric controller 5 configured to adjust the temperature $T_{ak}$ by means of the temperature sensor and temperature control unit to a set-point temperature with value $T_{x0}$ which is predetermined such that the temperature setting $T_{ak}=T_{x0}$ will result in the temperature $T_K$ inside the chamber to be set to $T_K=T_{target}$.

The incubator 1 comprises a display of the user interface unit 8 through which the electric controller 5 outputs information to the user and through which the user may make inputs. The information displayed includes in particular the estimated temperature $T_{Kb}$ inside chamber space 9. The incubator does not comprise a sensor with which the temperature inside the chamber $T_K$ could be measured with on-board means. The electric controller 5 is positioned in an electronics compartment 14 of the housing 7, whereas the compartment 14 outside the insulation layer 4 arranged between chamber 2 and housing 7 is arranged on the rear side of the incubator which is arranged. Compartment 14 also comprises the voltage supply 6a of the incubator. In addition, gas connections 17 for N2 and CO2 are provided on the rear side of the incubator.

Figure 3:
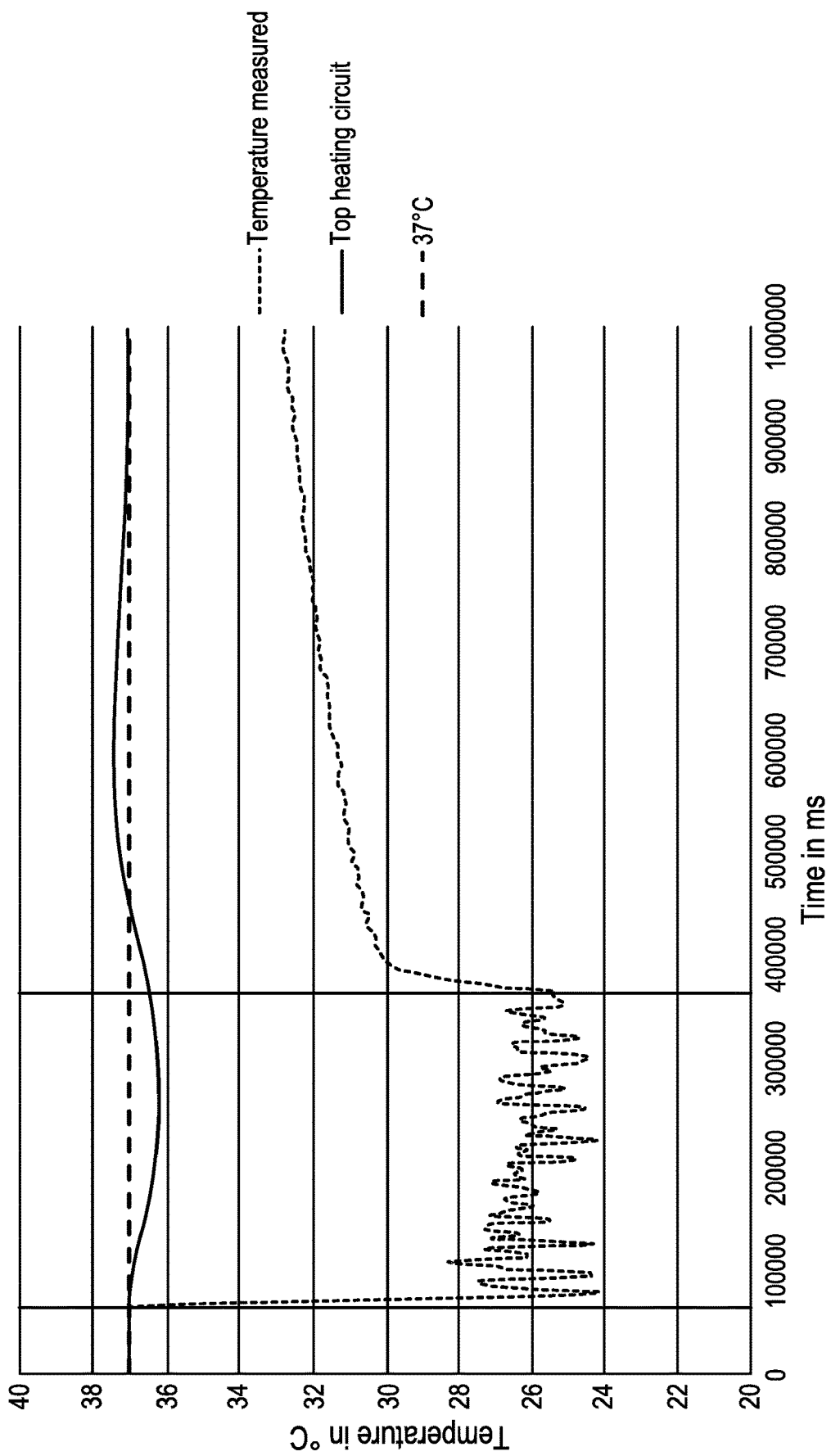
FIG. 3 shows a diagram with the temperature top_heating circuit=$T_{ak}+T_{offset}$ compared to a true chamber temperature that was measured with a mobile temperature sensor.

FIG. 3 shows that the chamber temperature $T_K$ which can be measured in the inside space 9 of chamber 2 by means of a verified mobile temperature sensor ("measured temperature") drops from 37° C. to approx. 26° C. after the housing door 16 and the chamber door 16b are opened and that the chamber temperature slowly goes back to the initial value of 37° C. once the doors are closed again. This is done by adjusting the temperature $T_{ak}$ ("top heating circuit") of the temperature sensor 3 arranged on the outer side to the predetermined, in this case device-specific value $T_{x0}$. Said value $T_{x0}$ may, and will normally, differ from the target temperature, but not necessarily. In the particular case of the exemplary incubator, said value was below 37° C. which is due to the fact that the temperature sensor used that measures $T_{ak}$ is not calibrated; such sensor calibration is not necessary because calibration of the laboratory tempering device's temperature accuracy is done by predetermining value $T_{x0}$. One can see that the value top_heating circuit=$T_{ak}$+$T_{offset}$ varies only slightly. However, according to the teaching of the invention this value is firmly linked to the chamber temperature $T_K$.

Figure 4:
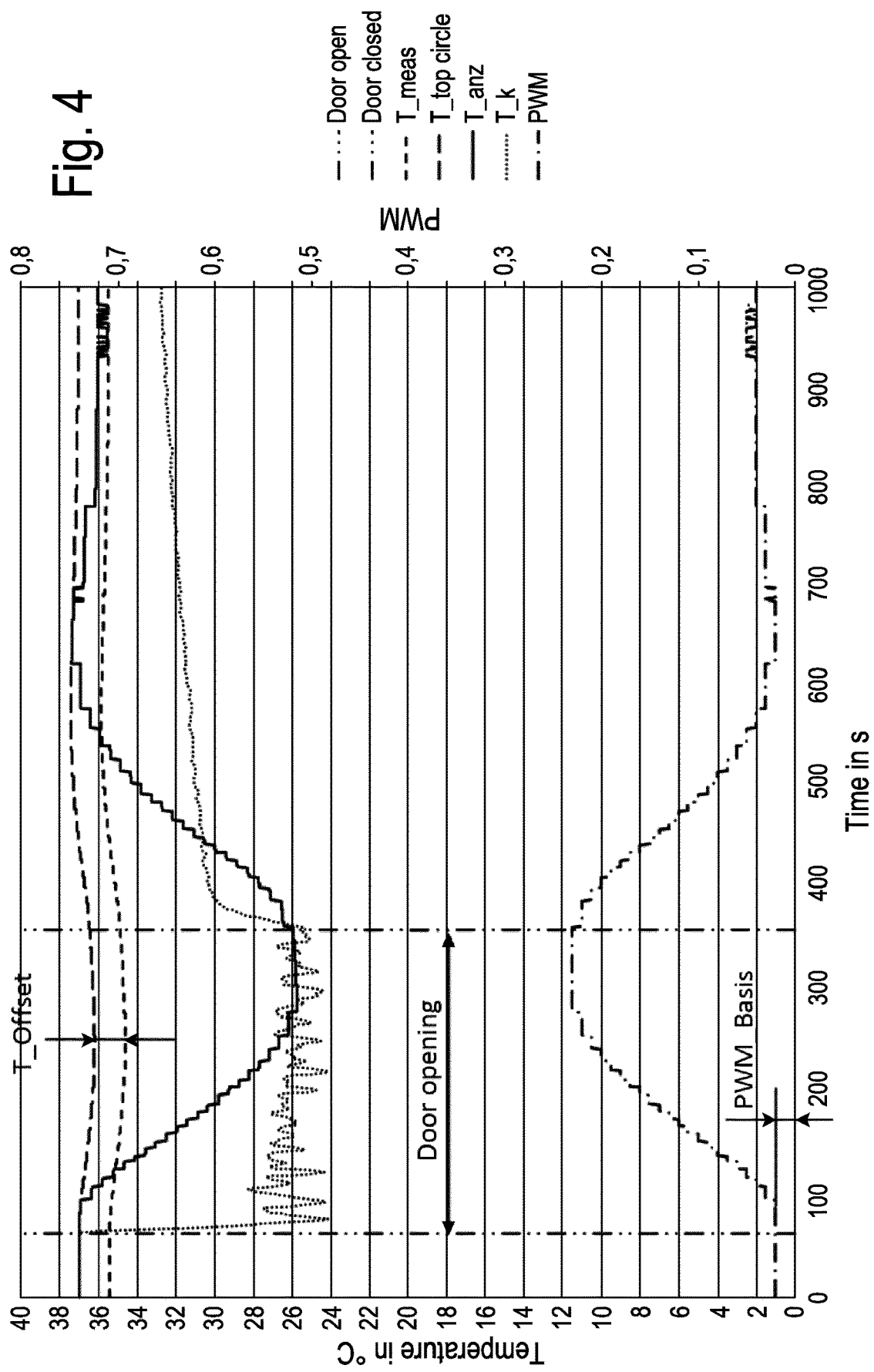
FIG. 4 shows a diagram where various temperature-related parameters of the incubator are applied against time when the chamber door and housing door are first opened and then closed.

FIG. 4 shows a diagram where various temperature-related parameters of the incubator are applied against time when the chamber door and housing door are first opened (first vertical line at $t_0$=70s) and then closed (second vertical line at $t_1$=370s). At time point $t_0$=70s, a base performance value $P_{basis}(t)$ ("PWM_basis") characterizing the power input of temperature control units 6 (heating circuit) is recorded which is calculated as the moving average of here 30 values for $P_{basis}(t)$ (which at that point in time have already passed but are stored in a memory of the electric controller). The curve $P_{basis}(t)$ of the temperature control's power input is called PWM and the scale is located on the right vertical axis. Those are values around 0.01 to 0.3 indicating the time-dependent duty cycle of the power supply of the temperature control unit controlled by means of pulse width modulation. The true chamber temperature $T_K$ measured by means of a verified mobile temperature sensor that is placed in the inside space 9 of the incubator for testing is also shown for purposes of explanation and better understanding. The temperature of the temperature sensor 3 on the outer side of the chamber wall 2a is shown as curve "T_mess". The curve "T_top circle" follows from a value $T_{offset}$ ("T_offset") as T_top circle=$T_{ak}(t)$+$T_{offset}$. Curve $T_{Kb}(t)$ is also entered, namely as "T_anz". The temperature values $T_{Kb}$ that vary according to this curve are shown as the calculated chamber temperature in display 8. Value $T_K$ in the inside space 9 of the chamber is estimated by calculation pursuant to equation 1 applied in this example:

$$T_K=T_{Kb}=T_{Kb}(t)=T_{ak}(t)+T_{offset}-(P_{temp}(t)-P_{basis}(t))*F.$$

Here, the apparatus-specific value $T_{x0}=T_{target}+T_{offset}$. Here, $T_{target}$=37° C.

Figure 5:
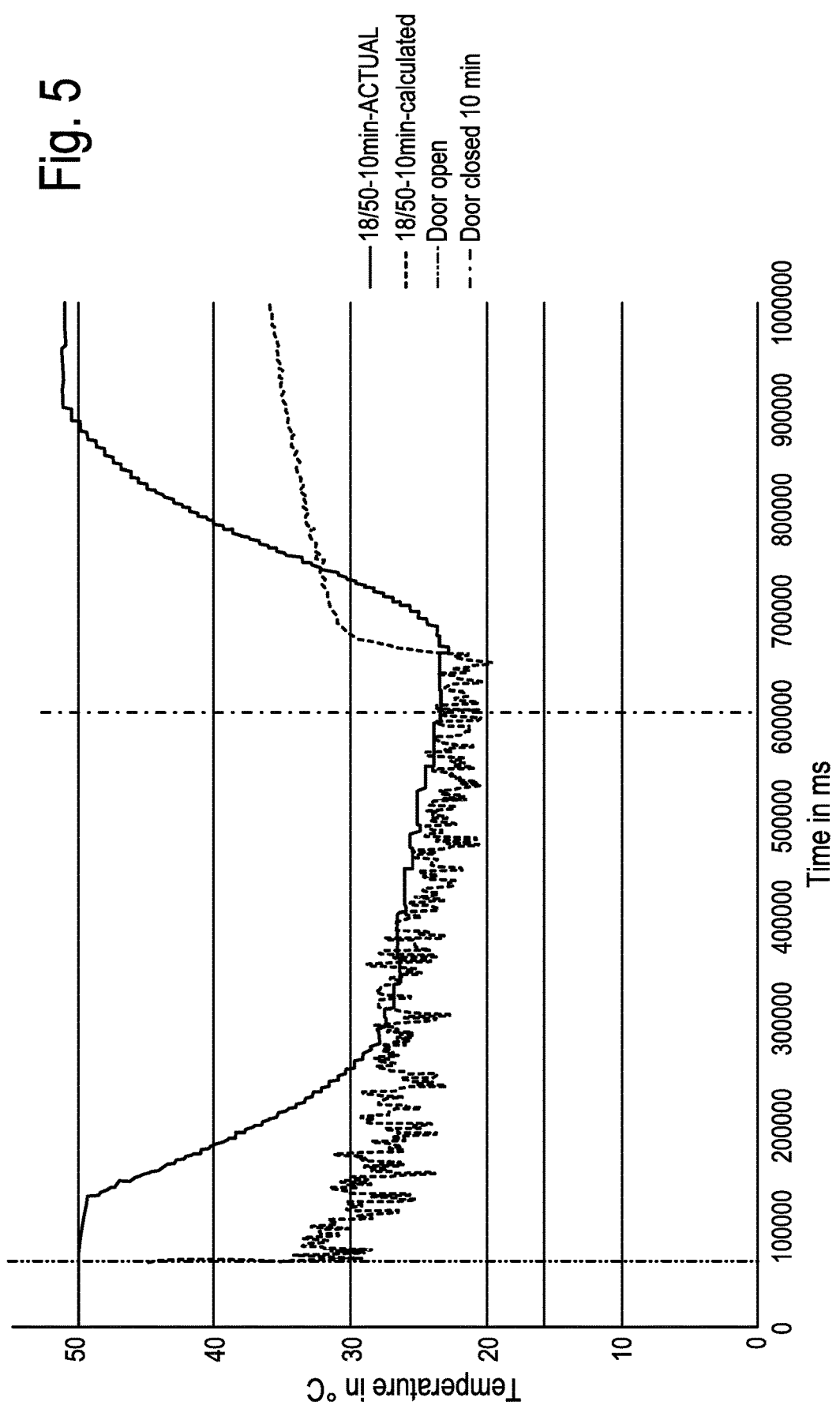
FIG. 5 shows a diagram where the curve of the true chamber temperature $T_K$, as applied against time, is shown that was measured with a mobile temperature sensor and a fit curve that was calculated based on error compensation.

FIG. 5 shows a diagram (temperature against time) to explain how the apparatus-specific value F is determined. Again, the true chamber temperature $T_K$ ("18/50-10 min-ACTUAL") is applied, as measured by means of a verified mobile temperature sensor that is placed in the inside space 9 of the incubator for testing purposes. The ambient temperature was 18° C. and the temperature inside the chamber was set to 50° C. The chamber temperature $T_K$ dropped after the door was opened. The fit curve is applied ideally to the curve $T_K$ (t) ("18/50-10 min-calculated") in the period between opening and closing the door(s) through parameter variation (error compensation). In this example, the fit curve follows equation 1 from which factor F can be derived which is defined for the incubator. Both apparatus-specific values $T_{x0}$ and F are deposited in a data storage unit. The temperature inside the chamber can be set by means of $T_{x0}$ and the temperature control of the temperature sensor $T_{ak}$. The temperature profile inside the chamber after opening the door can be estimated by means of scaling factor F.

Figure 7:
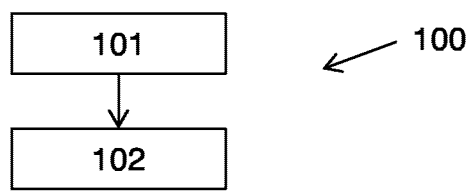

FIG. 7 shows one example of method 100 according to the invention for setting a target temperature $T_{target}$ in a chamber of a laboratory tempering device, in particular in a laboratory tempering device according to the invention pursuant to FIGS. 1 to 5, comprising the steps of:

Determining an apparatus-specific value $T_{x0}$ in particular by means of calibration method 200, with $T_{x0}$ being predetermined such that the setting of temperature $T_K$ inside the chamber to $T_K$=Ttarget results from the temperature setting $T_{ak}=T_{x0}$. (101)

Setting the outside temperature $T_{ak}$ to $T_{ak}=T_{x0}$ which results in the temperature $T_K$ inside the chamber being set to $T_K=T_{target}$. (102)

Figure 6:
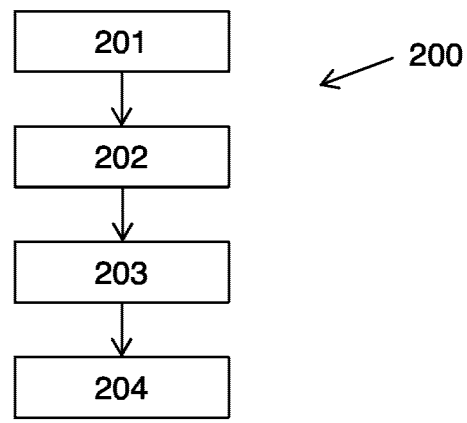
FIGS. 6, 7, 8, 9 and 10 show exemplary embodiments of methods according to the invention.

FIG. 6 shows one example of calibration method 200 according to the invention for calibrating a laboratory tempering device, in particular a laboratory tempering device according to the invention pursuant to FIGS. 1 to 5, comprising the steps of:

Awaiting a thermal equilibrium of the chamber; (201)

Adjusting, in a verified manner, the temperature $T_K$ inside the chamber to $T_K=T_{target}$ in a thermal equilibrium of the chamber; (202)

Determining $T_{x0}$ by means of an exterior temperature sensor $T_{ak}$ on the outer side of the chamber of the laboratory tempering device at the now reliably set temperature inside the chamber $T_K=T_{target}$. (203)

Storing $T_{x0}$ in the laboratory tempering device or in its data storage unit. (204)

Here, the temperature $T_K$ inside the chamber is set to $T_K=T_{target}$ in a verifiable manner by controlling $T_K=T_{target}$ which is done by connecting a mobile temperature sensor $T_{inside}$ placed inside the chamber for calibration purposes to the electric controller of the laboratory tempering device to establish a control circuit in which the mobile temperature sensor $T_{inside}$ inside the chamber operates as a measuring element of the control circuit and the temperature control unit(s) as a control element of the control circuit.

Figure 10:
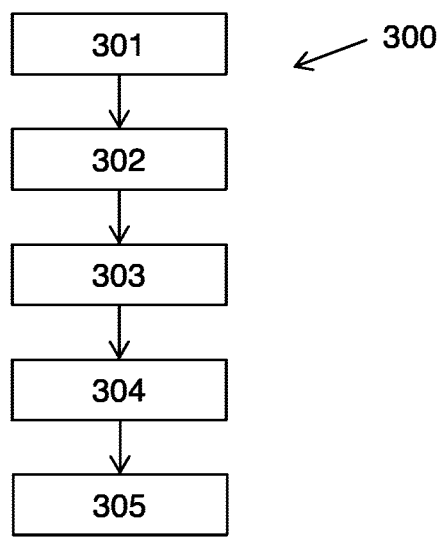

FIG. 10 shows one example of method 300 according to the invention for estimating the temperature $T_K$ inside the chamber of a laboratory tempering device, in particular in a laboratory tempering device according to one of FIGS. 1 to 5, comprising the steps of:

Determining the apparatus-specific value $T_{x0}$ in particular pursuant to the calibration method described in claim 8 or claim 9, with $T_{x0}$ being predetermined such that the setting of temperature $T_K$ inside the chamber to $T_K=T_{target}$ results from the temperature setting $T_{ak}=T_{x0}$; (301)

Determining an apparatus-specific value F; (302)

in particular: Setting the temperature $T_K$ inside the chamber to $T_K=T_{target}$ through temperature setting $T_{ak}=T_{x0}$; (303)

in particular: Recording the opening and closing of the chamber door and/or housing door of the laboratory tempering device; (304)

Estimating the value $T_K$ inside the chamber through calculation such that $$T_K=T_{Kb}=T_{Kb}(t)=T_{ak}(t)+T_{offset}-(P_{temp}(t)-P_{basis}(t))*F$$

with $T_{offset}$ being defined by $T_{offset}=T_{x0}-T_{target}$, $P_{basis}(t)$ being the power applied by the temperature control unit prior to opening the chamber door or housing door at steady state at a given ambient temperature. (305)

Figure 9:
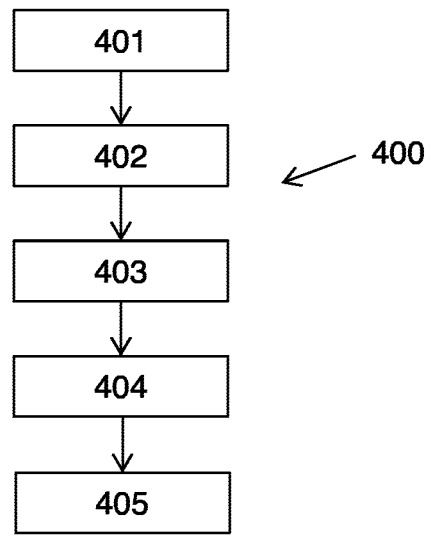

FIG. 9 shows one example of method 400 according to the invention for determining the apparatus-specific value F, comprising the steps of:

Placing the laboratory tempering device in an environment having a known outside temperature $T_{environment}$. (401)

Setting, in a verified manner, the temperature inside the chamber $T_K$ to a value $T_K=T_{target\_0}$ with $T_{environment}$ being in particular <>$T_{target\_0}$; (402)

Opening the chamber door and/or a housing door at a certain point in time t0 and closing the same door at a later point in time t1; (403)

Prior to and during opening and closing and thereafter:
Measuring the temperature inside the chamber $T_{inside}(t)$ and storing the temperature inside the chamber $T_{inside}(t)$ as a function of time; (404)

Using a calculation rule, preferably an equation, in particular "equation 1" for an error compensation between the equation and measured values $T_{inside}(t)$ to determine factor F. (405)

Here, the temperature $T_K$ inside the chamber is set to a value $T_K=T_{target\_0}$ in a verifiable manner by placing a mobile temperature sensor $T_{inside}$ inside the chamber and connecting the mobile temperature sensor $T_{inside}$ to the electric controller of the laboratory tempering device to establish a control circuit in which the mobile temperature sensor $T_{inside}$ inside the chamber operates as a measuring element of the control circuit and the temperature control unit(s) as a control element of the control circuit. The control is performed with the chamber door and/or housing door.

Figure 8:
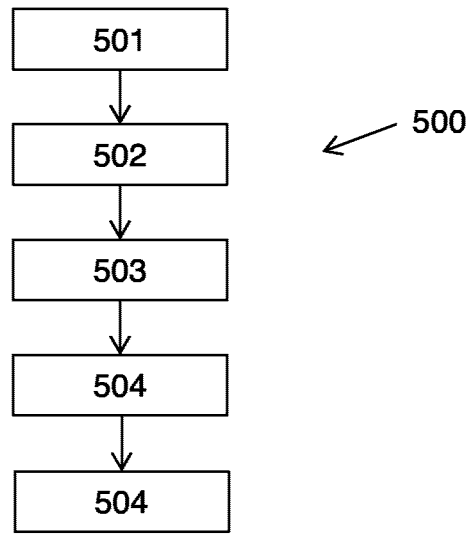

FIG. 8 shows one example of a method (500) according to the invention for performing a diagnosis to a laboratory tempering device for storing laboratory samples at a temperature $T_{target}$, the laboratory tempering device comprising:
a chamber for receiving laboratory samples inside chamber space the outer sides of which are formed by at least one chamber wall and one chamber door that closes a chamber opening through which the inside of the chamber can be accessed by the user,
a temperature control unit for tempering the chamber that is attached in thermal contact to an outer side of the chamber,
an exterior temperature sensor attached in thermal contact to an outer side of the chamber for recording a temperature $T_{ak}$,
an interior temperature sensor attached in thermal contact to the inside of the chamber for recording a temperature $T_{inside}$ which is in particular positioned inside,
an insulation element that thermally insulates the temperature control unit, the temperature sensor and the chamber from the environment, and
an electric controller configured to adjust the temperature $T_{ak}$ to a set-point temperature with the value $T_{target}$ by means of the interior temperature sensor and the temperature control unit, with the apparatus-specific value $T_{x0}$ being stored in a data storage unit,
the method comprising the steps of:
Adjusting the temperature inside the chamber to the value $T_{target}$; (501)
Measuring the temperature $T_{ak}$ when the temperature inside the chamber is adjusted to the value $T_{target}$ and a stationary equilibrium exists, (502)
Comparing $T_{ak}$ with $T_{x0}$, (503)
Preferably: Storing the results of the comparison of $T_{ak}$ with $T_{x0}$ in a data storage unit of the laboratory tempering device; (504)
Preferably: Outputting an error message by means of the user interface unit of the laboratory tempering device if the comparison shows that $T_{ak}< >T_{x0}$. (505)

The invention claimed is:

1. Laboratory tempering device (1) for tempering laboratory samples at a target temperature $T_{target}$, comprising:
a chamber (2) for receiving laboratory samples inside chamber space (9) the outer sides of which are formed by at least one chamber wall (2a) and one chamber door (16b) that closes a chamber opening through which the inside of the chamber can be accessed by the user,
a temperature control unit (6) for tempering the chamber that is attached in thermal contact to an outer side of the chamber,
a temperature sensor (3) attached in thermal contact to an outer side of the chamber for recording a temperature $T_{ak}$,
an insulation element (4) that thermally insulates the temperature control unit, the temperature sensor and the chamber from the environment, and
an electric controller (5) comprising a data processing unit configured and programmed to adjust the temperature $T_{ak}$ by means of the temperature sensor and temperature control unit to a set-point temperature with value $T_{x0}$ which is predetermined such that the temperature setting $T_{ak}=T_{x0}$ will result in the temperature $T_K$ inside the chamber being set to $T_K=T_{target}$,
whereby the temperature control unit is operated with electric power $P_{temp}(t)$ during temperature setting $T_{ak}=T_{x0}$ as a function of time, and the electric controller records said power $P_{temp}(t)$ and the time-dependent value $T_{ak}(t)$ and the data processing unit being programmed to calculate a temperature $T_{Kb}$ as the temperature inside the chamber as a function of the power $P_{temp}(t)$ and the measured temperature $T_{ak}(t)$.

2. Laboratory tempering device according to claim 1 that does not comprise a temperature sensor measuring the temperature inside the chamber and serving as a measuring element for the temperature control of the electric controller that adjusts $T_{ak}$ to a set-point temperature having the value $T_{x0}$ by means of the temperature sensor and temperature control unit.

3. Laboratory tempering device according to claim 1 wherein the electric controller comprises a data storage unit where the at least one predetermined value $T_{x0}$ is stored which is taken from the data storage unit for the purpose of setting temperature $T_{ak}=T_{x0}$.

4. Laboratory tempering device according to claim 1, wherein the laboratory tempering device comprises a chamber door sensor that records the opening and closing of the chamber door
or
the laboratory tempering device comprises an outer housing having a housing door which, when open, allows the user to access the inside of the chamber through the opened chamber door, and a housing door sensor that records the opening and closing of the housing door,
whereby the electric controller is configured to record the opening and closing of the chamber door or housing door as a function of time and to calculate temperature $T_{Kb}$ as the temperature inside the chamber also as a function of the points in time when the chamber door or housing door is opened and closed.

5. Laboratory tempering device according to claim 1, wherein the electric controller is configured to calculate a temperature $T_{Kb}(t)$ after opening and closing the chamber door or a housing door of the laboratory tempering device as a function of time t as the temperature inside the chamber pursuant to $$T_{Kb}(t)=T_{ak}(t)+T_{offset}-(P_{temp}(t)-P_{basis}(t))*F$$

with $T_{offset}$ being defined by $T_{offset}=T_{x0}-T_{target}$, $P_{basis}(t)$ being the power applied by the temperature control unit prior to opening the chamber door or housing door at steady state at a given ambient temperature and F being a scaling factor.

6. Method (100) for setting a target temperature $T_{target}$ in a chamber of a laboratory tempering device according to claim 1, comprising the steps of:
- determining an apparatus-specific value $T_{x0}$, with $T_{x0}$ being predetermined such that the setting of temperature $T_K$ inside the chamber to $T_K=T_{target}$ results from the temperature setting $T_{ak}=T_{x0}$, and
- setting the outside temperature $T_{ak}$ to $T_{ak}=T_{x0}$ which results in the temperature $T_K$ inside the chamber being set to $T_K=T_{target}$.

7. Method according to claim 6, with $T_{x0}$ being determined in advance by means of a calibration method (200), comprising the steps of:
- awaiting a thermal equilibrium of the chamber;
- adjusting, in a verified manner, the temperature $T_K$ inside the chamber to $T_K=T_{target}$ in a thermal equilibrium of the chamber; and
- determining $T_{x0}$ by means of an exterior temperature sensor $T_{ak}$ on the outer side of the chamber of the laboratory tempering device at the now reliably set temperature inside the chamber $T_K=T_{target}$.

8. Method according to claim 7, whereby $T_K=T_{target}$ is set by connecting a mobile temperature sensor $T_{inside}$ that has been placed inside the chamber for calibration purposes is connected to the electric controller of the laboratory tempering device to establish a control circuit in which the mobile temperature sensor $T_{inside}$ inside the chamber operates as a measuring element of the control circuit and the temperature control unit(s) as a control element of the control circuit.

9. Method (300) for estimating the temperature $T_K$ inside the chamber of a laboratory tempering device according to claim 1, comprising the steps of:
- determining the apparatus-specific value $T_{x0}$, with $T_{x0}$ being predetermined such that the setting of temperature $T_K$ inside the chamber to $T_K=T_{target}$ results from the temperature setting $T_{ak}=T_{x0}$;
- determining an apparatus-specific value F;
- setting the temperature $T_K$ inside the chamber to $T_K=T_{target}$ through temperature setting $T_{ak}=T_{x0}$; and
- estimating the value $T_K$ inside the chamber through calculation.

10. Method according to claim 9, whereby the value $T_K$ inside the chamber is estimated through calculation such that $$T_K=T_{Kb}=T_{Kb}(t)=T_{ak}(t)+T_{offset}-(P_{temp}(t)-P_{basis}(t))*F,$$

with $T_{offset}$ being defined by $T_{offset}=T_{x0}-T_{target}$, $P_{basis}(t)$ being the power applied by the temperature control unit prior to opening the chamber door or housing door at steady state at a given ambient temperature and F being an apparatus-specific or device-specific value.

11. Method (400) according to claim 10, whereby the value F is determined as follows:
- placing the laboratory tempering device in an environment having a known outside temperature $T_{environment}$;
- setting, in a verified manner, the temperature inside the chamber $T_K$ to a value $T_K=T_{target\_0}$ with $T_{environment}$ being in particular not equal to $T_{target\_0}$;
- opening the chamber door and/or a housing door at a certain point in time to and closing the same door at a later point in time t1;
- prior to and during opening and closing and thereafter: measuring the temperature inside the chamber $T_{inside}(t)$ and storing the temperature inside the chamber $T_{inside}(t)$ as a function of time; and
- using an equation, in particular "equation 1" for an error compensation between the equation and measured values $T_{inside}(t)$ to determine factor F.

12. Method according to claim 11, whereas setting, in a verifiable manner, the temperature inside the chamber $T_K$ to a value $T_K=T_{target\_0}$ is done as follows:
- placing a mobile temperature sensor $T_{inside}$ inside the chamber and connecting the mobile temperature sensor $T_{inside}$ to the electric controller of the laboratory tempering device to establish a control circuit in which the mobile temperature sensor $T_{inside}$ inside the chamber operates as a measuring element of the control circuit and the temperature control unit(s) as a control element of the control circuit, wherein the control is performed with the chamber door and/or housing door.

13. Laboratory tempering device according to claim 1 which is a CO2 incubator for cell cultures.

14. Producing a laboratory tempering device according to claim 1, wherein the device-specific value $T_{x0}$ is determined in advance by:
- awaiting a thermal equilibrium of the chamber;
- adjusting, in a verified manner, the temperature $T_K$ inside the chamber to $T_K=T_{target}$ in a thermal equilibrium of the chamber; and
- determining $T_{x0}$ by means of an exterior temperature sensor $T_{ak}$ on the outer side of the chamber of the laboratory tempering device at the now reliably set temperature inside the chamber $T_K=T_{target}$.

* * * * *